(12) United States Patent
Kanamaru et al.

(10) Patent No.: US 6,951,124 B2
(45) Date of Patent: Oct. 4, 2005

(54) METHOD FOR MAKING ELEMENTS OF A CONTINUOUSLY VARIABLE TRANSMISSION BELT

(75) Inventors: Hisanobu Kanamaru, Sagamihara (JP); Nobuyuki Ishinaga, Sagamihara (JP); Shingo Fujikawa, Sagamihara (JP)

(73) Assignee: Aida Engineering Co., Ltd., Sagamihara (JP)

( * ) Notice: Subject to any disclaimer, the term of this patent is extended or adjusted under 35 U.S.C. 154(b) by 308 days.

(21) Appl. No.: 10/462,097

(22) Filed: Jun. 12, 2003

(65) Prior Publication Data

US 2004/0029670 A1 Feb. 12, 2004

(30) Foreign Application Priority Data

Jun. 12, 2002 (JP) .............................. 2002-170906

(51) Int. Cl.[7] .......................... F16G 1/22; B21D 31/06; B21D 28/04
(52) U.S. Cl. ............................ 72/336; 72/334; 72/337; 59/8; 59/35.1; 474/242
(58) Field of Search ...................... 72/334–340; 59/8, 59/35.1; 474/202, 204, 242, 244

(56) References Cited

U.S. PATENT DOCUMENTS

| | | | | |
|---|---|---|---|---|
| 4,320,647 A | * | 3/1982 | Kummeling et al. | ......... 72/338 |
| 4,894,049 A | * | 1/1990 | Koppelaars | .................. 474/242 |
| 6,389,865 B1 | * | 5/2002 | Easterbrook | .................. 72/334 |
| 6,427,512 B2 | * | 8/2002 | Suzuki et al. | .................. 72/327 |
| 6,526,798 B2 | * | 3/2003 | Suzuki | ........................ 72/330 |
| 6,742,373 B2 | * | 6/2004 | Wakui | ........................ 72/331 |
| 6,748,787 B1 | * | 6/2004 | Liu | .............................. 72/334 |
| 6,863,632 B2 | * | 3/2005 | Serkh | .............................. 59/8 |

FOREIGN PATENT DOCUMENTS

| | | |
|---|---|---|
| EP | 1 132 648 A | 9/2001 |
| EP | 1 158 203 A | 11/2001 |
| JP | 2001-246428 A1 | 9/2001 |

OTHER PUBLICATIONS

European Search Report mailed on Aug. 18, 2004.
Patent Abstracts of Japan for JP2001-246428 published Sep. 11, 2001.

* cited by examiner

*Primary Examiner*—David Jones
(74) *Attorney, Agent, or Firm*—Darby & Darby

(57) ABSTRACT

Notched areas are provided on the outer periphery of a flat plate in the coining process to allow material of said plate flow more easily toward the periphery during the coining process. Use of flat plate provides a more economical way of making elements with accurate size and dimensions for continuously variable transmission belt.

2 Claims, 6 Drawing Sheets

METHOD FOR MAKING ELEMENTS OF A CONTINUOUSLY VARIABLE TRANSMISSION BELT

BACKGROUND OF THE INVENTION

1. Field of the Invention

The present invention relates to a method of making the elements of a continuously variable transmission belt. The elements of a continuously variable transmission belt are metal pieces that constitute a Van Dome type belt used in a continuously variable transmission used on automobiles.

2. Description of the Related Art

The prior art in this field is exemplified in Unexamined Publication of Patent Application (A) 2001-246428. As shown in FIG. 3 of said publication, element 1 is produced by punching it out from plate 12. Plate 12 has corners 14 and the central part in a cross section is thick, while the thickness reduces outward from each corner 14 in a tapered shape. A pair of elements 1a and 1b is aligned by said tapered shape and is punched out by means of the fine blanking method.

The problems with this prior art are: firstly, plate 12 is expensive to manufacture; and secondly, it is difficult to obtain identical elements from tapered plate 12. In other words, it is difficult to control the accuracies of the dimensions (primarily the thickness) and the shape of the punched out elements. The first problem can be easily understood from the fact that it is more expensive to produce a tapered plate accurately than to produce a flat plate from the standpoint of facility requirements and complexity of the machining process. The second problem can also be easily understood from the fact that the punching of a tapered plate causes delicate changes in the thickness in various parts of the plate, so that plates with uniform dimensions and shapes cannot be obtained without determining the locations of those parts in high accuracy.

3. Problems to be Solved by the Invention

The present invention intends to provide a method of making the elements of a continuously variable transmission belt of high accuracy using a relatively inexpensive plate blank.

SUMMARY OF THE INVENTION

It is to obtain elements of desired shapes and dimensions using a flat plate blank by means of providing a coining process and notched areas to encourage better flows of material. More specifically, the invention of claim 1 is a method of making elements of a continuously variable transmission belt by coining plates and then punching, in particular, by providing notched areas on the outer periphery of said plates in the coining process, so that the material of said plates can flow more easily toward the periphery during the coining process. The invention of claim 2 is a method of making elements of a continuously variable transmission belt described in claim 1, wherein said plate has such a size and a shape that two elements are produced together from it arranged in such a way that their heads are facing with each other, said notched areas are constrictions located between said two elements provided along two abutting heads, while other notched areas are located toward the bottom center of each element's body.

PREFERRED EMBODIMENT OF THE INVENTION

Figure 1:
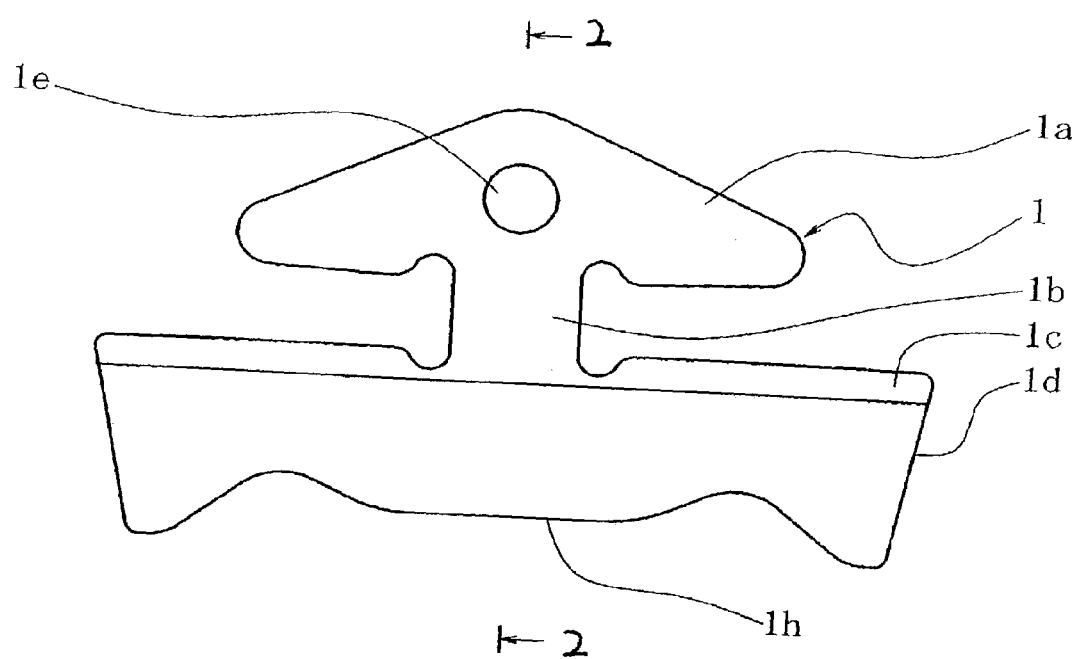
FIG. 1 is a front view of an element of the present invention.
Figure 2:
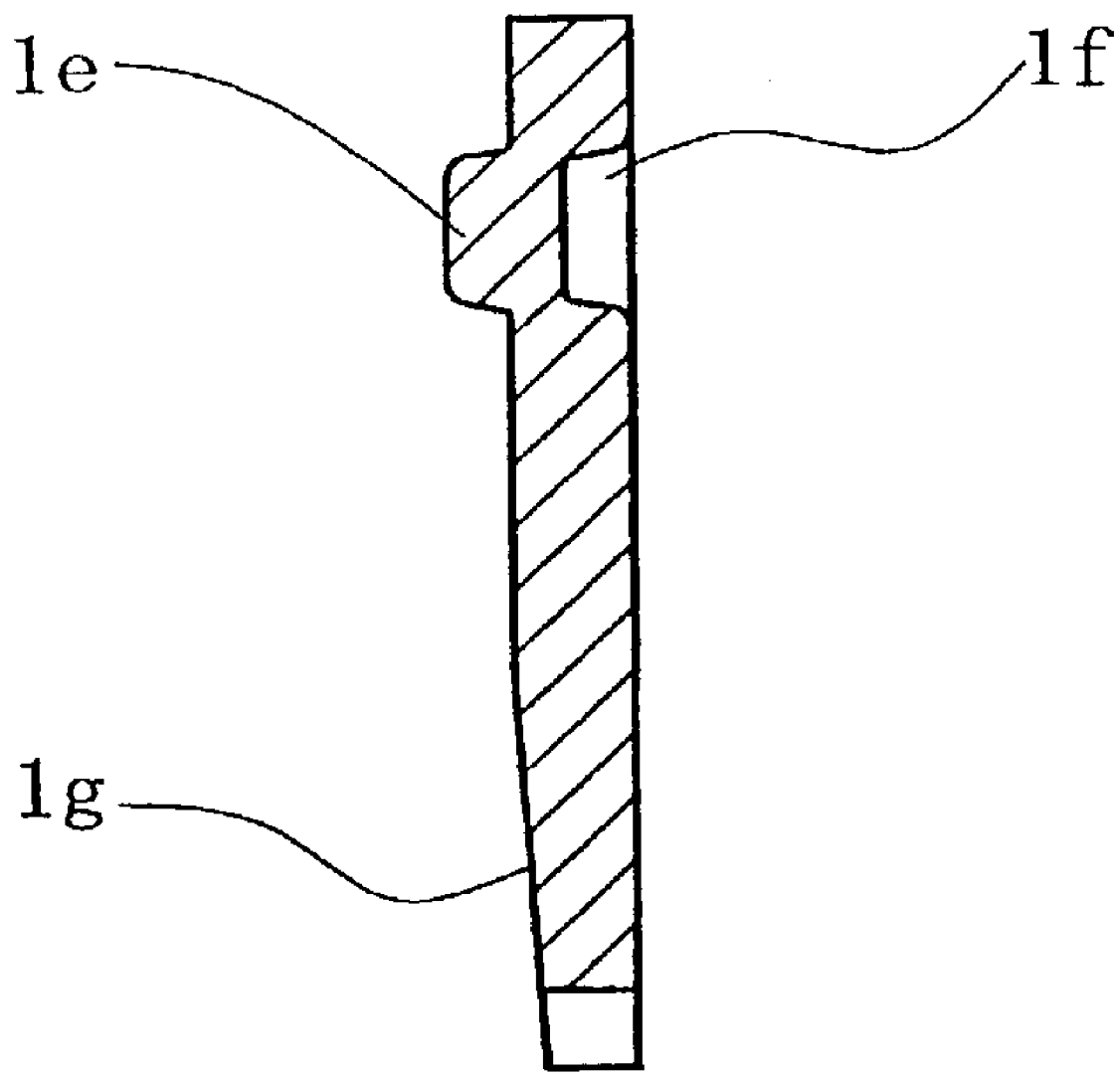
FIG. 2 is a cross sectional view along line 2—2 of FIG. 1.

FIGS. 1 and 2 show an element 1. A plurality of these elements is stacked together to form a belt. Adjoining elements engage with each other by means of a protrusion 1e and a cavity 1f. A ring fits on both sides of a neck part 1b to cause a plurality of elements 1 composes a ring shape to form a belt. When the belt is applied on pulleys, slanted areas 1d formed on both sides of a body 1c are sandwiched between pulley surfaces, a head 1a is on the outside of the belt, and a bottom 1h is on the inside of the belt. A tapered portion 1g shown in FIG. 2 is a relief to avoid the middle parts do not interfere with each other when the belt is aligned along the pulleys. In other words, without tapered portion 1g, it is impossible to apply the belt on the pulleys.

Figures 3A, 3B:
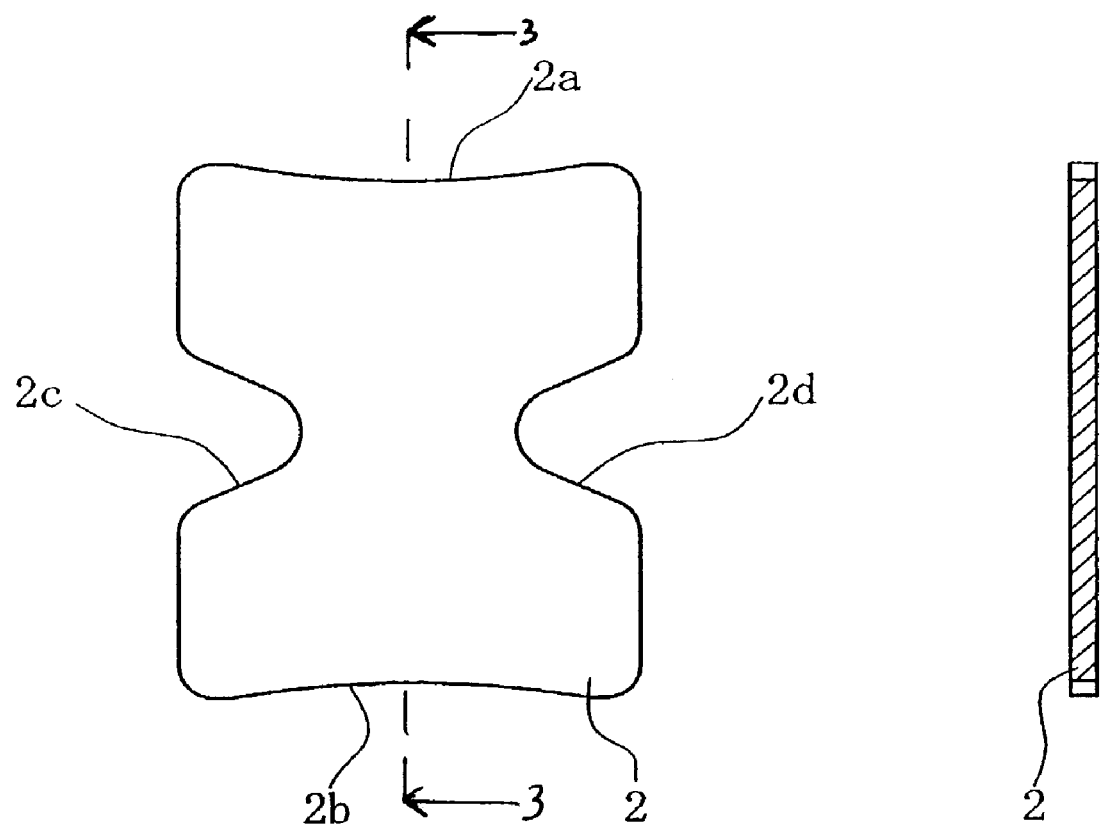
FIG. 3(a) is a front view of a plate after a punching process.
FIG. 3(b) is a cross sectional view along line 3—3 of FIG. 3(a)
Figure 4A:
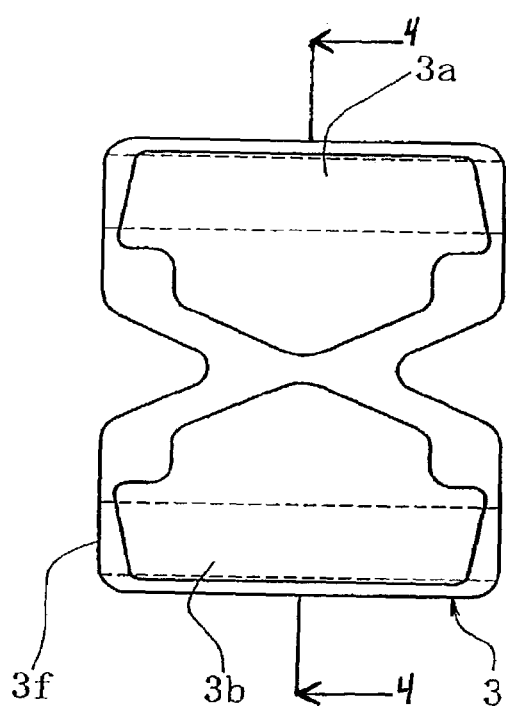
FIG. 4(a) is a front view of an intermediate product after a coining process.
Figure 4B:
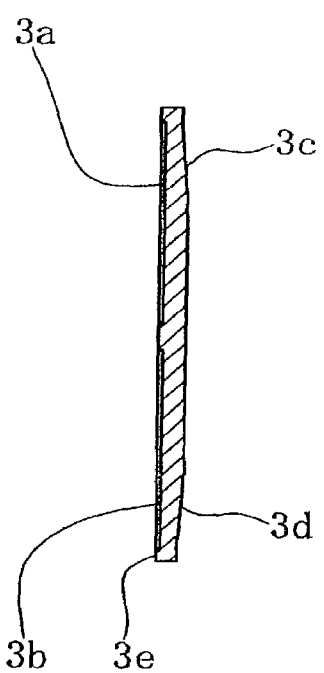
FIG. 4(b) is a cross sectional view along line 4—4 of FIG. 4(a)
Figure 5A:
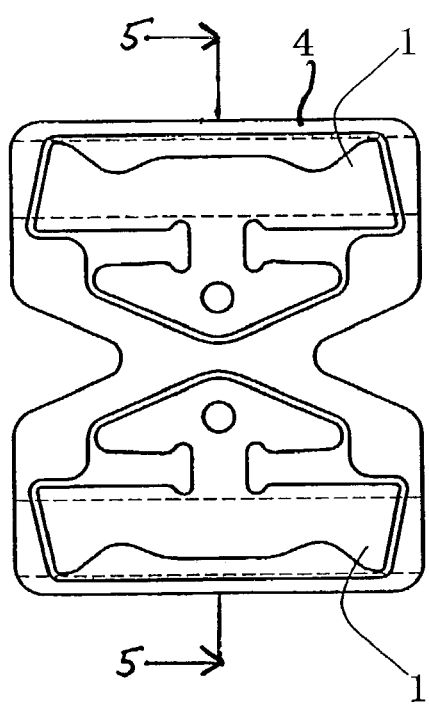
FIG. 5(a) is a front view of a coined intermediate product after another punching process.
Figures 5B, 5C:
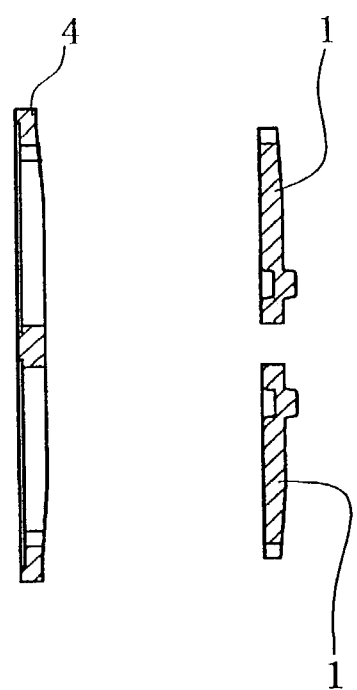
FIG. 5(b) is a cross sectional view of scrap along line 5—5 of FIG. 5(a)
FIG. 5(c) is a cross sectional view of the element along line 5—5 of FIG. 5(a)

FIGS. 3(a) and 3(b); FIGS. 4(a) and 4(b); and FIGS. 5(a), 5(b), and 5(c) show a series of manufacturing process, namely a punching process, a coining process and a punching process in that order. In FIG. 3, plate 2 is obtained from the blank plate by a punching process. Plate 2 has a shape and dimensions to obtain tow pieces of elements together. To produce two pieces together is to improve the productivity and material yield.

FIG. 3(a) is a front view and FIG. 3(b) is a cross section in the center of FIG. 3(a). A piece of element 1 is produced above notched areas 2c and 2d, while another piece of element 1 is produced below the notched areas. Notches 2a and 2b are formed in large arcs, while notched 2c and 2d are formed as relatively narrow. The shapes of these notches are determined considering the external shape to be constrained in the next coining process that follows and the flow of material. The material flow will be described later with reference to FIG. 6.

FIG. 4, (a) is a front view of an intermediate product 3 and (b) is a cross section in the center of (a) view. Said plate 2 is placed in a coining die, and the outer periphery of plate 2 becomes an outer periphery 3f shown in FIG. 4 as a result of the coining process. Notches 3a and 3b are where elements 1 are formed later and have tapered portions 3c and 3d, where the thickness of each area is already that of the final thickness of element 1.

FIG. 5 shows a process of first punching out the coined intermediate product to obtain element 1. In this figure, (a) is a front view of intermediate product 3 as it is punched out to produce element 1 and a scrap 4, (b) is a cross section view of scrap 4, and (c) is a cross section view of element 1. As shown here, two pieces of elements 1 are obtained simultaneously.

Figure 6:
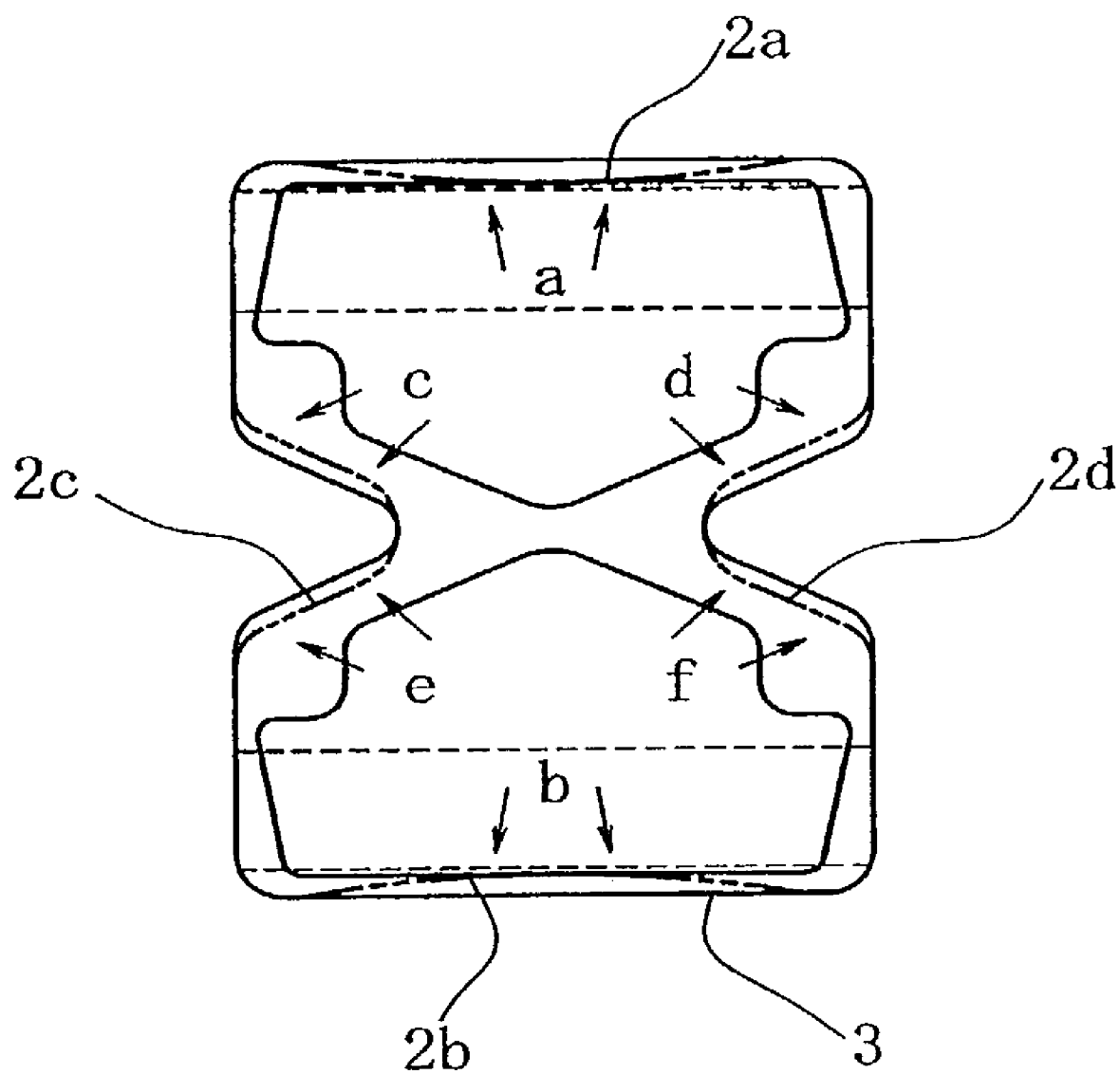
FIG. 6 illustrates the material flow in the punching process.

Let us describe here about the material flow in the aforementioned coining process. In FIG. 6, the notched areas of plate 2 are the areas 2a, 2b, 2c and 2d indicated by double-dotted chain lines, and the shape indicated by solid lines on the outside is the outer shapes of the intermediate product 3, i.e., the inner shape that is used in the coining process.

During the coining process, the material flows in the directions indicated by arrows a, b, c, d, e and f. When a plate is coined, the center of the plate normally increases its thickness by approximately 50 $\mu$m. In this embodiment, the thickness errors can be reduced to approximately 5 $\mu$m thanks to the provisions of notches 2a, 2b, 2c and 2d.

In other words, notches 2a, 2b, 2c and 2d help to encourage the flow of materials in the directions of a, b, c, d, e and f, thus eliminating said bulging effect in the middle. These notches are located to help the materials in the center of the plate to move outward. In other words, providing notches in the corner areas are not effective in encouraging the material flow.

Slanted area 1d in FIG. 1 is an important area that contacts with the pulleys to generate torque, so that it is not recommendable to provide notches in this area in order to secure the material in this area.

The size of a notched area is determined based on the condition that the blank material eventually fills up the coining die. However, it is not required to maintain the thickness of the fringe areas as they are scrapped anyway after the coining process. Therefore, the size of the notches does not have to be controlled accurately. For the same reason, said fringe areas are pressed lightly only in limited areas during this coining process.

The notched areas are preferably shaped with smooth curved as much as possible so that the coining die will be sufficiently filled with material.

What is claimed is:

1. A method of making an element of a continuously variable transmission belt comprising:
    providing notched areas on an outer periphery of a plate;
    coining said plate wherein a material of said plate can flow more easily toward the periphery during the coining; and
    punching said plate to form said element.

2. The method of claim 1, further comprising:
    producing two elements from said plate, wherein each of said elements include a head and an opposing bottom, comprising:
        arranging said elements on said plate so that the head of one element faces the head of the other element;
        locating notched areas between the heads of the elements; and
        locating other notched areas toward a center of said bottom of each said element.

* * * * *